United States Patent
Benoliel et al.

(10) Patent No.: US 12,349,232 B1
(45) Date of Patent: *Jul. 1, 2025

(54) DELAY TOLERANT DECENTRALIZED NETWORK

(71) Applicant: Noodle Technology Inc., San Francisco, CA (US)

(72) Inventors: Micha Anthenor Benoliel, San Francisco, CA (US); Kyude Karyan, San Jose, CA (US)

(73) Assignee: Noodle Technology Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,728

(22) Filed: Mar. 14, 2025

Related U.S. Application Data

(63) Continuation of application No. 16/653,976, filed on Oct. 15, 2019, which is a continuation of application
(Continued)

(51) Int. Cl.
| | |
|---|---|
| *H04W 8/00* | (2009.01) |
| *H04W 4/02* | (2018.01) |
| *H04W 4/021* | (2018.01) |
| *H04W 4/20* | (2018.01) |
| *H04W 4/80* | (2018.01) |

(Continued)

(52) U.S. Cl.
CPC .......... *H04W 8/005* (2013.01); *H04W 4/02* (2013.01); *H04W 4/022* (2013.01); *H04W 4/20* (2013.01); *H04W 4/80* (2018.02); *H04W 64/003* (2013.01); *H04W 72/20* (2023.01); *H04W 88/08* (2013.01)

(58) Field of Classification Search
CPC ......... H04W 8/005; H04W 4/80; H04W 4/02; H04W 4/022; H04W 4/20; H04W 64/003; H04W 72/0406; H04W 88/08
See application file for complete search history.

(56) References Cited

U.S. PATENT DOCUMENTS

| | | |
|---|---|---|
| 7,248,167 B2 | 7/2007 | Wassingbo |
| 7,843,343 B2 | 11/2010 | Thorn |
| | (Continued) | |

FOREIGN PATENT DOCUMENTS

| | | |
|---|---|---|
| CN | 104838707 A | 8/2015 |
| CN | 105051779 A | 11/2015 |
| | (Continued) | |

OTHER PUBLICATIONS

Extended European Search Report for European Application No. 22167768.5, mailed Jun. 9, 2022, 08 Pages.
(Continued)

*Primary Examiner* — Michael J Moore, Jr.
(74) *Attorney, Agent, or Firm* — Buchalter; Jason W. Croft

(57) ABSTRACT

A system may include processing logic configured to execute instructions to cause a system to perform operations including receiving a beacon from a first intermediate device via a first network. The operations may also include identifying a characteristic of the beacon. The operations may include identifying, based on the characteristic of the beacon, a server that is associated with the beacon. The operations may include sending a beacon message to the server via a third network.

18 Claims, 8 Drawing Sheets

Related U.S. Application Data

No. 16/003,024, filed on Jun. 7, 2018, now Pat. No. 10,448,238.

(60) Provisional application No. 62/516,590, filed on Jun. 7, 2017.

(51) Int. Cl.
*H04W 64/00* (2009.01)
*H04W 72/20* (2023.01)
*H04W 88/08* (2009.01)

(56) References Cited

U.S. PATENT DOCUMENTS

| | | | |
|---|---|---|---|
| 8,704,657 B2 | 4/2014 | Huang | |
| 8,810,392 B1 | 8/2014 | Teller et al. | |
| 8,981,938 B2 | 3/2015 | Kazerouni | |
| 9,107,152 B1* | 8/2015 | Wurster | H04W 40/244 |
| 9,366,746 B2 | 6/2016 | Kazerouni | |
| 9,389,299 B2* | 7/2016 | Jaffri | G01S 5/0018 |
| 9,628,956 B1* | 4/2017 | Kim | H04W 4/023 |
| 9,794,744 B1* | 10/2017 | Gu | H04W 12/06 |
| 9,807,726 B1* | 10/2017 | Nguyen | H04W 4/80 |
| 9,854,445 B1* | 12/2017 | Gu | H04W 4/70 |
| 9,961,498 B2* | 5/2018 | Evans | H04W 4/029 |
| 9,997,043 B2 | 6/2018 | Kazerouni | |
| 10,163,318 B2 | 12/2018 | Kazerouni | |
| 10,204,499 B1* | 2/2019 | Newstadt | G08B 21/0269 |
| 10,448,238 B2* | 10/2019 | Benoliel | H04W 4/02 |
| 10,609,514 B2* | 3/2020 | Evans | H04W 4/029 |
| 10,769,924 B2 | 9/2020 | Kazerouni | |
| 11,047,702 B1* | 6/2021 | Meyer | G01C 21/3632 |
| 11,663,896 B2 | 5/2023 | Kazerouni | |
| 2011/0234399 A1 | 9/2011 | Yan | |
| 2011/0319072 A1* | 12/2011 | Ekici | H04W 48/18 455/553.1 |
| 2013/0254264 A1 | 9/2013 | Hankinson et al. | |
| 2014/0269654 A1* | 9/2014 | Canpolat | H04W 48/18 370/338 |
| 2015/0339694 A1 | 11/2015 | Robbin et al. | |
| 2016/0080486 A1* | 3/2016 | Ram | H04L 12/1822 709/205 |
| 2016/0119739 A1 | 4/2016 | Hampel et al. | |
| 2016/0165387 A1* | 6/2016 | Nhu | H04W 4/80 455/41.1 |
| 2016/0165570 A1* | 6/2016 | Kim | H04W 4/029 455/456.2 |
| 2016/0182170 A1* | 6/2016 | Daoura | H04W 12/033 455/3.01 |
| 2016/0285979 A1* | 9/2016 | Wang | H04W 48/10 |
| 2016/0286543 A1 | 9/2016 | Putterman et al. | |
| 2016/0338000 A1* | 11/2016 | Halla | H04W 4/029 |
| 2016/0342906 A1* | 11/2016 | Shaashua | H04L 67/306 |
| 2017/0019873 A1* | 1/2017 | Britt | G06Q 30/0261 |
| 2017/0076306 A1* | 3/2017 | Snider | G06Q 30/0205 |
| 2017/0169688 A1* | 6/2017 | Britt | G08B 25/10 |
| 2017/0171196 A1* | 6/2017 | Britt | H04L 63/0876 |
| 2017/0171204 A1* | 6/2017 | Forood | H04W 4/80 |
| 2017/0192102 A1* | 7/2017 | Wietfeldt | G01S 5/009 |
| 2017/0195136 A1* | 7/2017 | Ghosh | H04L 47/72 |
| 2017/0238129 A1* | 8/2017 | Maier | H04W 4/14 455/404.2 |
| 2017/0272900 A1* | 9/2017 | Do | G01S 5/021 |
| 2017/0289750 A1* | 10/2017 | Haapanen | G08B 13/2462 |
| 2017/0339525 A1* | 11/2017 | Schrader | H04W 4/029 |
| 2017/0346677 A1* | 11/2017 | Suryanarayana | H04L 45/28 |
| 2017/0359796 A1* | 12/2017 | Wirola | G01S 5/0269 |
| 2018/0020329 A1* | 1/2018 | Smith | H04W 4/08 |
| 2018/0063680 A1* | 3/2018 | Bitra | G01S 5/02521 |
| 2018/0132061 A1* | 5/2018 | Bitra | G01S 5/10 |
| 2018/0160282 A1* | 6/2018 | van de Poll | H04W 4/029 |
| 2018/0180704 A1* | 6/2018 | Khan | G01S 5/0236 |
| 2018/0183874 A1* | 6/2018 | Cook | H04L 41/145 |
| 2018/0206096 A1* | 7/2018 | Sharma | H04L 67/55 |
| 2018/0241489 A1* | 8/2018 | Daoura | H04L 67/10 |
| 2018/0262870 A1* | 9/2018 | Seo | H04W 4/021 |
| 2018/0270608 A1* | 9/2018 | Thoresen | H04W 12/06 |
| 2018/0313944 A1* | 11/2018 | Park | G01S 11/06 |
| 2018/0317266 A1* | 11/2018 | Britt | H04W 4/80 |
| 2018/0359626 A1* | 12/2018 | Benoliel | H04W 4/80 |
| 2018/0367947 A1* | 12/2018 | Kim | H04W 4/021 |
| 2020/0092683 A1* | 3/2020 | Fyfe | H04L 67/125 |
| 2020/0128385 A1 | 4/2020 | Benoliel et al. | |
| 2020/0265288 A1* | 8/2020 | Volkerink | H04W 4/33 |

FOREIGN PATENT DOCUMENTS

| | | |
|---|---|---|
| CN | 105338489 A | 2/2016 |
| CN | 105340304 A | 2/2016 |
| EP | 2955898 A1 | 12/2015 |
| JP | 2001258079 A | 9/2001 |
| JP | 2012505620 A | 3/2012 |
| JP | 2012256986 A | 12/2012 |
| JP | 2017537549 A | 12/2017 |
| WO | 2015069369 A1 | 5/2015 |
| WO | 2015137332 A1 | 9/2015 |
| WO | 2018227021 A1 | 12/2018 |

OTHER PUBLICATIONS

Final Office Action for U.S. Appl. No. 16/653,976, dated Oct. 7, 2024, 25 Pages.

International Preliminary Report on Patentability for International Application No. PCT/US2018/036557, mailed Dec. 19, 2019, 09 Pages.

International Search Report and Written Opinion for International Application No. PCT/US2018/036557, mailed Sep. 5, 2018, 14 Pages.

Karyan K., et al., "System For Crowdsourcing Data Using Wireless Radios," U.S. Appl. No. 62/516,590, filed Jun. 7, 2017, 11 Pages.

Non-Final Office Action for U.S. Appl. No. 16/653,976, dated Apr. 8, 2024, 25 pages.

Notice of Allowance for Japanese Patent Application No. 2023-076184 dated May 7, 2024, 6 Pages.

Office Action for Brazilian Application No. 112019025803-5, dated Jan. 26, 2024, 7 pages.

Office Action for Chinese Application No. 201880051474.5, mailed Jan. 29, 2021.

Office Action for Japanese Patent Application No. 2020-517767, mailed Jan. 19, 2021, 8 Pages.

Office Action for Korean Patent Application No. 10-2020-7000491, mailed Feb. 23, 2021, 18 Pages.

Office Action for Korean Patent Application No. 10-2021-7025018, mailed Nov. 13, 2021, 10 Pages.

Office Action for Korean Patent Application No. 10-2024-7002058 dated Mar. 18, 2024, 8 Pages with Translation.

Office Action and Search Report for Chinese Patent Application No. 202210540654.8 mailed Feb. 22, 2025, 23 pages with machine translations.

Office Action of Korean Patent Application No. 10-2024-7002058 mailed Feb. 4, 2025, 18 pages with translations.

\* cited by examiner

DELAY TOLERANT DECENTRALIZED NETWORK

CROSS-REFERENCE TO RELATED APPLICATIONS

This application is a continuation of U.S. patent application Ser. No. 16/653,976, filed Oct. 15, 2019, which is a continuation of U.S. patent application Ser. No. 16/003,024, filed Jun. 7, 2018, which claims priority to U.S. Provisional Application No. 62/516,590, filed Jun. 7, 2017, titled System for Crowdsourcing Data Using Wireless Radios, each of which are incorporated herein by reference in their entirety.

FIELD

The embodiments discussed herein are related to decentralized networking.

BACKGROUND

The Internet of Things (IoT)—the network of connected "smart" devices that communicate seamlessly over the Internet—is expanding into every aspect of human life. Increasingly, IoT devices are being used for healthcare at hospitals, and in medical device and pharmaceutical manufacturing. In cities, IoT devices help track and monitor pollution. IoT devices can also be used by governments, militaries, companies, and individuals for asset tracking and management. Although these applications serve different purposes, they all share one characteristic-a dependence on strong connectivity. Soon, conventional networks will be unable to handle the bandwidth requirements of billions of IoT devices.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving a beacon from a first intermediate device via a first network. The beacon may have been received by the first intermediate device from an endpoint device via a second network. The method may also include identifying a characteristic of the beacon. The method may include identifying, based on the characteristic of the beacon, a server that is associated with the beacon. The method may also include sending a beacon message to the server via a third network, the beacon message including at least one of the beacons, or information pertaining to the beacon. The method may further include receiving, from the server, a response message pertaining to the beacon message. The method may include processing the response message.

According to another aspect, a method may include detecting movement of a first intermediate device from a first geographic location to a second geographic location. The method may also include receiving a beacon from an endpoint device responsive to the first intermediate device moving to the second geographic location. The method may further include identifying a relay server to send a beacon message. The beacon message may include at least one of: the beacon, or information pertaining to the beacon. The method may include sending the beacon message from the endpoint device to the relay server.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
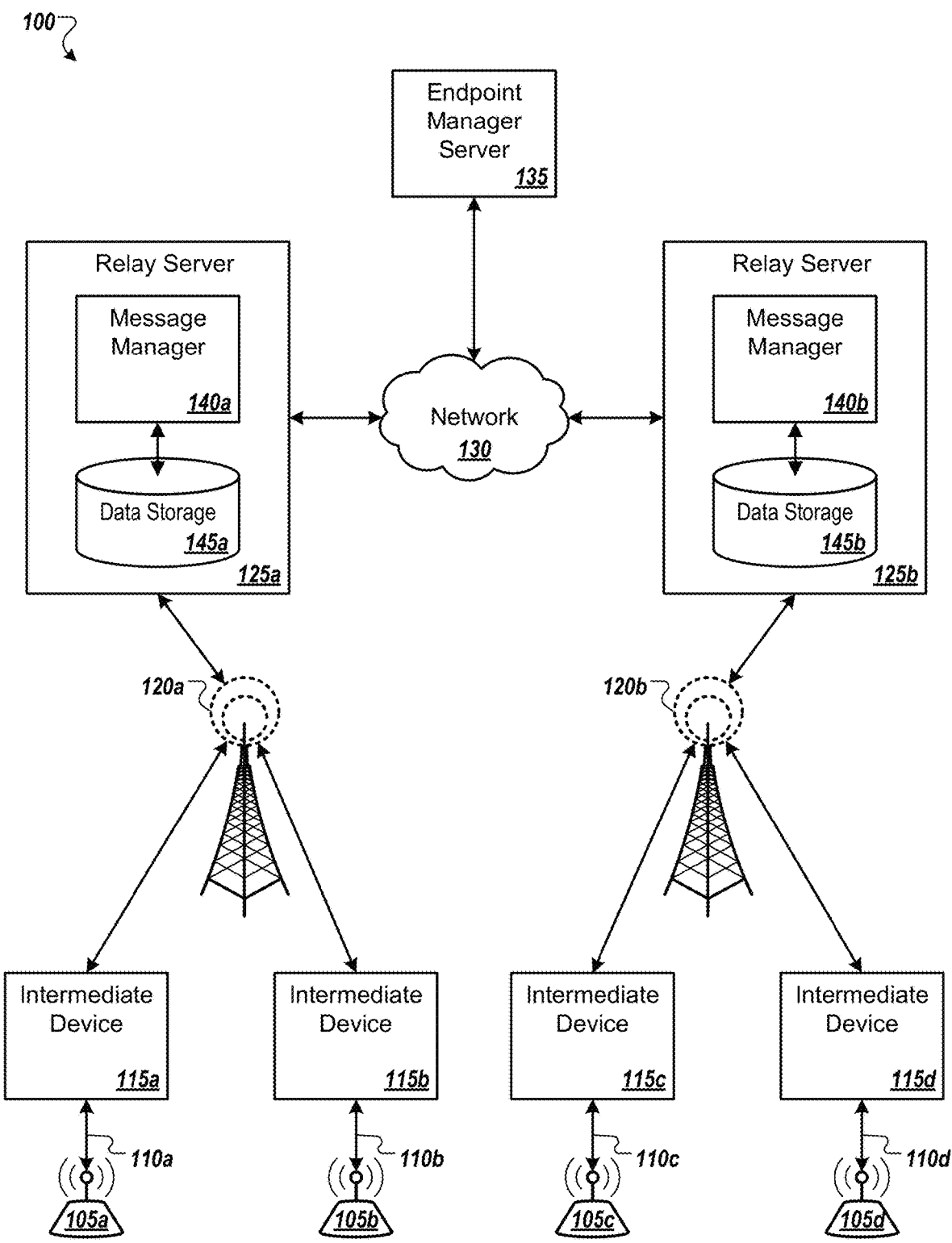
FIG. 1 illustrates an example network architecture.

The Internet of Things (IoT) is expanding into every aspect of human life. With over 75 Billion IoT devices expected to be deployed by 2025, a more efficient new network infrastructure is needed to bring these devices online and connect them to each other.

Many connectivity solutions exist for IoT devices. Unfortunately, all suffer problems of limited bandwidth, decreased connectivity, high power consumption, and/or high cost. For example, cellular connections may consume significant power in a device and may also be expensive. Low power solutions, such as a Low-Power Wide-Area Network (LP-WAN) may consume less power than cellular connections. LPWANs, however, may be constrained by limited bandwidth and may not be able to transmit enough data to fully serve the needs of distributed networks. Conventional systems may not consume a relatively low amount of power while still providing high bandwidth.

Specifically, to connect a small device to the Internet today, existing solutions include: (a) using an existing wireless network, for example, by incorporating a cellular module with a subscriber identification module (SIM) card or software SIM into the device to give it a cellular connection, (b) building a new alternative wireless network by incorporating a custom radio chipset and building fixed infrastructure to support this network, and (c) using long range network technology such as LoRa Alliance Technology. LoRa uses a complex "star-of-stars" topology of gateways and bridges between IoT devices and a "central network server" on the industrial, scientific and medical (ISM) spectrum band.

Each of these approaches have significant drawbacks. For example, each of these approaches require a significant amount of power which often is a major contributor to battery drain in mobile devices. Further, approach (a) requires expensive cellular modules and, in addition, a monthly fee for wireless cellular service for both, service subscription and data to a wireless carrier. Approaches (b) and (c) are also expensive, because they require building new, fixed infrastructure, and often require purchasing a chipset for radio transmission in addition to the popular Bluetooth® chipsets. The longer the transmission range, the greater the power requirement, so each of these approaches require significant power. Similarly, cellular devices and Global Positioning System (GPS) enabled devices require high power to communicate with a cell tower or satellites because of longer distances.

Aspects of the present disclosure address these and other problems with conventional networking by providing a new decentralized network. In some aspects, a decentralized network may connect numerous devices using low-power while providing higher connectivity and/or bandwidth. An embodiment includes a crowd-source based method for sending data from an IoT device to a server that does not rely on a fixed infrastructure. Another embodiment includes a crowd-source method for a cloud server to send data to an IoT device that does not rely on a fixed infrastructure. A further embodiment includes a method for routing data in beacons from multiple services on multiple IoT devices to the appropriate device manufacturer servers. Yet another embodiment includes a method to reduce energy consumption on mobile devices used to collect or exchange data with remote IoT devices.

In one aspect, the present disclosure describes systems and techniques to improve upon existing technologies by obviating the need for separate, fixed infrastructure by using crowd-sourcing techniques. Some aspects provide a methodology for IoT device-to-server communication that has a low power consumption profile and does not require massive fixed hardware infrastructure. Other benefits of the present disclosure is in its ability to lower the cost of Internet access and to create a platform for new innovations in the field of IoT.

The present disclosure may be useful to virtually every field that uses network-based communications. Example parties that may benefit from this disclosure include, but are not limited to, smartphone manufacturers, bike and ride sharing companies, outdoor advertisers, environmental analytics companies, etc. Example applications may include use for pollution tracking, asset tracking, finding lost devices, industrial predictive maintenance, etc. Further, aspects of the present disclosure may not rely on connectivity using SIM or LPWAN modems, which enables devices to be smaller and more efficient.

For example, in location tracking of devices and assets scenarios, most low cost tracking device makers rely on app users to locate devices, and do not have sufficient app density to provide global coverage. Adding a cellular module and a GPS module is expensive and power hungry. Aspects of the present disclosure may provide a solution that does not require endpoint devices to include cellular or GPS modules which interoperates globally, and lowers costs.

In an example of low power sensor connectivity, the cost of some sensors is so low that adding cellular or GPS connectivity can be an order of magnitude more expensive than the cost of the sensor. Aspects of the present disclosure may provide a connectivity service at a radically lower cost.

Some aspects may also be used for firmware updates, updating date and time of devices, creating a wearable device network, data IP connectivity, measuring population density (such as by detecting the number of Bluetooth® devices in a given location), checking the presence of a specific device for insurance companies, detecting trends of sales of a specific device for market analytics companies, hedge funds and private equity companies, etc.

Moreover, delay tolerant use cases, such as location updates and environmental/health data, may also benefit from the present disclosure. For example, many use cases do not require immediate cloud or Internet connectivity. In this context, the present disclosure leverages smartphones' Bluetooth® connectivity, and their Wi-Fi offloading capabilities to offer a significantly enhanced bandwidth compared to LPWANs.

FIG. 1 illustrates an example network architecture 100 in which embodiments of the present disclosure may be implemented. The network architecture 100 may include one or more endpoint devices 105, one or more intermediate devices 115, one or more relay servers 125, and one or more endpoint manager servers 135. In some embodiments, the network architecture 100 may be capable to move data between one or more endpoint devices 105 and various endpoint manager servers 135 by way of crowd-sourced intermediate devices 115, which may function act as network clients, and one or more relay servers 125.

An endpoint device 105 may include one or more IoT devices. The endpoint device 105 may include a power supply, a data collection device (e.g., a sensor), and a network device. The power supply may include a battery or a connection to a power grid. Additionally or alternatively, the power supply may include an energy harvesting apparatus, such as a solar panel, solar cell, solar photovoltaic, electromagnetic, etc. In at least some embodiments, the endpoint device 105 may not include a power supply and may instead use ambient backscatter techniques. The endpoint device 105 may also include one or more sensors. The one or more sensors may be configured to detect any type of condition, and generate electronic data based on a detected condition. For example, the endpoint device 105 may include a smart watch with a heart rate monitor that is configured to generate heart rate data using heart rate conditions collected by the heart rate monitor. In at least one embodiment, the endpoint device 105 does not have capability to communicate over the Internet and only includes hardware and/or software capable of communicating with nearby devices, such as a nearby intermediate device 115.

The network device of the endpoint device 105 may include any hardware, software, or combination thereof that is capable to communicate with another device via a network. In at least one embodiment, the network device may include any network controller configured to communicate via a short-range network, such as Bluetooth® or any other short-range network. In at least one embodiment, the network device may include any network controller configured to communicate via a low-power network. Example endpoint devices 105 include, but are not limited to, industrial devices, residential appliances, commercial equipment, inventory trackers, smart watches, wearables, heart rate monitors, logistics trackers, environmental sensors, cash registers, credit card readers, point-of-sale (POS), bikes, electric scooters, electric skate boards, cars, electric cars, satellites, or any device (mobile and not mobile that includes a wireless radio interface. The network architecture 100 may include any number of endpoint devices 105 and the endpoint devices 105 in the network architecture 100 may be any type of endpoint device 105, including any type of network-capable device. The endpoint devices 105 may be fixed or relatively stationary in the network architecture 100, such as a POS or a pollution sensor. Additionally or alternatively, the endpoint devices 105 may be mobile, such as a smart watch, or any car or vehicle.

The one or more endpoint devices 105 may be configured to communicate with other devices via at least one wireless network 110. For example, a first endpoint device 105a may be in electronic communication with a first intermediate device 115a via a wireless network 110a. The one or more intermediate devices 115 may include any type of device capable of communicating with an endpoint device 105 via the wireless network 110 and with a relay server 125 via a second network 120. In at least one embodiment, an intermediate device 115 may include two network controllers-a first network controller to communicate via the wireless network 110 and a second network controller to communicate via the second network 120. Example intermediate devices 115 include personal computers (PC), laptops, smart phones, netbooks, e-readers, personal digital assistants (PDA), cellular phones, mobile phones, tablets, vehicles, drones, cars, trucks, wearable devices, routers, televisions, or set top boxes, etc.

As illustrated, the first endpoint device 105a may be in electronic communication with the first intermediate device 115a via the wireless network 110a (e.g., a short-range network). Further, a second endpoint device 105b may be in electronic communication with a second intermediate device 115b via another wireless network 110b (e.g., a low-power network). A third endpoint device 105c may be in electronic communication with a third intermediate device 115c via another wireless network 110c. A fourth endpoint device 105d may be in electronic communication with a fourth intermediate device 115d via another wireless network 110d.

In some embodiments, the wireless network 110 may be any network that uses a relatively low amount of power. Example wireless networks 110 may include any Bluetooth® network type (e.g., Bluetooth Low Energy (BLE), Bluetooth 4.0, Bluetooth 5.0, Bluetooth Long Range), NB-IoT, LTE Direct, LTE-M, LTE M2M, 5G, Wi-Fi, Wi-Fi Aware or any low-power network. The one or more endpoint devices 105 may connect to various intermediate devices 115 using different types of wireless networks 110. For example, the first endpoint device 105a may be in electronic communication with the first intermediate device 115a via a first short-range wireless network 110a and the second endpoint device 105b may be in electronic communication with the second intermediate device 115b via a second short-range wireless network 110b.

Endpoint devices 105, intermediate devices 115, or both, may be fixed, relatively stationary or moveable. When an endpoint device 105 and an intermediate device 115 come into wireless range of each other, the endpoint device 105 and the intermediate device 115 may perform a handshake and/or authentication to initiate data exchange between the endpoint device 105 and the intermediate device 115.

In some embodiments, the endpoint device 105 may periodically send beacons that include data via the wireless network 110. The endpoint devices 105 may include various services that may run on the endpoint devices 105. For example, a smart watch may include a clock service, a heart rate monitor service, a motion detection service, a music service, etc. Beacons may be generated for each of these services or a single beacon may be generated to include data for some or all of the services.

An intermediate device 115 may listen for such beacons from endpoint devices. Responsive to receiving a beacon, the intermediate device 115 may send the beacon to a relay server 125 via a second network 120. In at least one embodiment, the wireless network 110 and the second network 120 are different types of networks. For example, the wireless network 110 may be a Bluetooth® network and the second network 120 may be a cellular network, Wi-Fi, or the Internet.

The second network 120 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof.

The relay server 125 may send the beacon, or information related to the beacon, to an endpoint manager server 135 via a third network 130. The third network 130 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof. In at least one embodiment, the second network 120 and the third network 130 are the same network or include at least some overlapping components.

The one or more relay servers 125 may include one or more computing devices, such as a rackmount server, a router computer, a server computer, a personal computer, a mainframe computer, a laptop computer, a tablet computer, a desktop computer, smartphone, cars, drones, a robot, any mobility device that has an operating system, etc.), data stores (e.g., hard disks, memories, databases), networks, software components, and/or hardware components. The one or more relay servers 125 may be configured to receive a beacon from an intermediate device 115. The one or more relay servers 125 may send the beacon, or data related to or associated with to an endpoint manager server 135. The one or more relay servers 125 may receive a message from the endpoint manager server 135 and, in some embodiments, may send the message from the endpoint manager server 135 to an intermediate device 115. In at least some embodiments, the intermediate device 115 may perform one or more operations responsive to receiving the message from the endpoint manager server 135. The operations include operations local to the intermediate device 115, and/or sending the message from the endpoint manager server 135 to an endpoint device 105.

The endpoint manager server 135 may include one or more computing devices, such as a rackmount server, a router computer, a server computer, a personal computer, a mainframe computer, a laptop computer, a tablet computer, a desktop computer, a smartphone, a car, a drone, a robot, any mobility device that has an operating system etc.), data stores (e.g., hard disks, memories, databases), networks, software components, and/or hardware components. The endpoint manager server 135 may be associated with one or more endpoint devices 105. For example, a particular corporation, person, or manufacturer may sell an endpoint device 105 and may use an endpoint manager server 135 to communicate with and/or control the endpoint device 105.

The endpoint manager server 135 may send messages associated with a particular endpoint device 105, or a set of endpoint devices 105. For example, the endpoint manager server 135 may send updates (e.g., firmware, software) to the particular endpoint device 105, or the set of endpoint devices 105. The endpoint manager server 135 may send other communications to an endpoint device 105, such as a response to a request from a beacon generated by the particular endpoint device 105.

Each relay server 125 may include a message manager 140. The message manager 140 may be implemented using hardware including a processor, a microprocessor (e.g., to perform or control performance of one or more operations), an FPGA, or an ASIC. In some other instances, the message manager 140 may be implemented using a combination of hardware and software. Implementation in software may include rapid activation and deactivation of one or more transistors or transistor elements such as may be included in hardware of a computing system (e.g., the relay server 135). Additionally, software defined instructions may operate on information within transistor elements. Implementation of software instructions may at least temporarily reconfigure electronic pathways and transform computing hardware.

Each relay server 125 may include a data storage 145. The data storage 145 may include any memory or data storage. In some embodiments, the data storage 145 may include computer-readable storage media for carrying or having computer-executable instructions or data structures stored thereon. The computer-readable storage media may include any available media that may be accessed by a general-purpose or special-purpose computer, such as a processor. For example, the data storage 145 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 145. In the depicted embodiment, the data storage 145 is part of the relay server 125. In some embodiments, the data storage 145 may be separate from the relay server 125 and may access the data storage 145 via a network. In at least one embodiment, the data storage 145 may include multiple data storages.

The data storage 145 may include data pertaining to the endpoint devices 105, intermediate devices 115, and endpoint manager servers 135 and relationships between the endpoint devices 105, intermediate devices 115, and endpoint manager servers 135. For example, the data storage 145 may include a table or list of endpoint devices that are associated with a particular endpoint manager server 135. The data storage 145 may include data pertaining to beacons received from endpoint devices, such as a timestamp of the receipt of the beacon, a timestamp associated with the creation of the beacon, a geo-location associated with the beacon and/or the endpoint device 105 that created or transmitted the beacon, sensor data associated with the endpoint device, routing information for how and/or where to send data between endpoint manager servers 135 and endpoint devices 105, connection strengths between intermediate devices and endpoint devices, proximity of an endpoint device 105 to an intermediate device 115, type of wireless network 110 that connects an intermediate device 115 and an endpoint device 105, a cost of a connection between an intermediate device 115 and an endpoint device 105, a current battery level of the intermediate device, a type of intermediate device, etc.

The message manager 140 may process communications between the endpoint devices 105, the intermediate devices 115 and the endpoint manager server(s) 135. In an example, the message manager 140 may receive a beacon from the intermediate device 115*a* via the second network 120*a*. The beacon may have been sent to the intermediate device via the wireless network 110*a* by endpoint device 105*a*. A beacon may contain characteristics about the endpoint device 105, including an identifier of the endpoint device 105 (e.g., a MAC address, a unique ID), a geographical location of the endpoint device 105*a*, and advertisements of the UUIDs of the services it supports, etc. The message manager 140 may identify the characteristic of the beacon, such as by analyzing the beacon to identify information pertaining to the beacon. The message manager 140 may access the data storage 145 to identify, based on the characteristic of the beacon, an endpoint manager server 135 that is associated with the beacon. For example, the identifier of the endpoint device may be associated with a particular manufacturer that operations a particular endpoint manager server 135. The message manager 140 may identify this particular endpoint manager server 135 in the data storage 145 and an address and/or path to send the beacon in order to reach the endpoint manager server 135. In at least some embodiments, the message manager 140 may send the beacon, or a beacon message to the endpoint manager server 135 via the third network 130. The beacon message may include the beacon, may not include the beacon, or may include information pertaining to the beacon.

In at least one embodiment, a beacon may include data from multiple services associated with the endpoint device 105. Additionally or alternatively, multiple beacons from a single endpoint device 105 may be generated and broadcast via the wireless network 110. Each of these multiple beacons, for example, may be associated with a different service associated with the endpoint device 105. The message manager 140 may identify the services, and based on information for the service, identify an appropriate endpoint manager server 135 that should receive a beacon message.

The endpoint manager server 135 may receive the message from the relay server 125. The endpoint manager server 135 may store the message, process the message, generate a report based on the message, may generate a notification or response based on the message, or any other action. For example, endpoint manager server 135 may generate a response message pertaining to the beacon message. The response message may include a message intended for one or more of the relay server 125, an intermediate device 115, the endpoint device 105 that generated the beacon, or another endpoint device 105 that did not generate the beacon. The endpoint manager server 135 may send the response message to the same relay server 125 that sent the beacon message to the endpoint manager server 135 (e.g., the relay server 125*a*), or to a different relay server 125 that did not send the beacon message to the endpoint manager server 135 (e.g., relay server 125*b*).

The relay server 125 may receive, from the endpoint manager server 135, the response message pertaining to the beacon message. The relay server 125 may process the response message, such as by performing operations at the relay server 125, sending data to another device (e.g., a user device), sending data to an endpoint device 105, etc.

The network architecture 100 may be used to exchange data between any devices capable of network-based communication in a manner that is different than conventional communication over the Internet.

In an example, the network architecture 100 may leverage existing smartphone infrastructure to create delay-tolerant connectivity. The network architecture 100 can move data to the cloud in an initially delay tolerant fashion, which may be useful for many types of IoT communications such as firmware updates, status updates, log-file storage, and micropayments. The intermediate device may include software that runs on smartphones to periodically scan for other devices (e.g., the endpoint devices 105) like industrial devices, smartwatches, wearables, logistics trackers, and environmental sensors. These endpoint devices 105 may connect with the software client running on the smartphones to create massive, area wide networks for moving data to and within the cloud.

Further, it has been estimated that 95% of the human population is covered by some sort of cellular service. The network architecture 100 can be deployed anywhere in the world and enables regions of lower connectivity to increase their connectivity. Moreover, the network architecture 100 can provide coverage beyond the reach of conventional cellular networks by using software that runs on Bluetooth®-enabled smartphones, for example. Users may travel to areas of limited or no cellular connectivity, but still may receive beacons from endpoint devices 105 via the wireless network 110. Using the network architecture 100, telco operators, for example, can now easily deploy a software update to their user devices to begin communicating with endpoint devices 105 as described herein to provide higher latency IoT connectivity to even the remotest regions of the world.

In a specific example, the network architecture 100 can be used for asset tracking and management. For example, the network architecture 100 can be used to find lost items that are configured as an endpoint device 105, such as a skateboard with a wireless radio chipset, an attached tracking beacon, a laptop, etc. A user, for example, may indicate that the item is lost, such as by using a mobile application or website to indicate, to the endpoint manager server 135 or to the relay server 125, that the item is lost. In a first embodiment, the endpoint manager server 135 may send a message to one or more relay servers 125 to watch for the lost item. The relay servers 125 may add an identifier of the lost item to a lost item watch list. As intermediate devices 115 move to different geographic locations, they can receive beacons from different endpoint devices 103. The intermediate devices 115 then forward the beacons to the relay servers 125. When a relay server 125 server receivers a beacon, the relay server 125 can analyze the beacon to determine if the beacon originated at an endpoint device 105 that is on the watch list. When the relay server 125 identifies a beacon that originated at an endpoint device 105 that is on the watch list, the relay server 125 can notify the endpoint manager server 135 that the lost item has been found. In at least some embodiments, the relay server 125 may send the notification that the lost item has been found as a push notification or as a pull notification (i.e., in response to a request from the endpoint manager server 135). In at least some embodiments, the relay server 125 may send the notification that the lost item has been found to the user device that was used by the user to indicate that the item was lost.

Modifications, additions, or omissions may be made to the network architecture 100 without departing from the scope of the present disclosure. The present disclosure more generally applies to the network architecture 100 including one or more endpoint devices 105, one or more wireless networks, one or more intermediate devices 115, one or more second networks 120, one or more relay servers 125, one or more third networks 130, and one or more endpoint manager servers 135 or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 2:
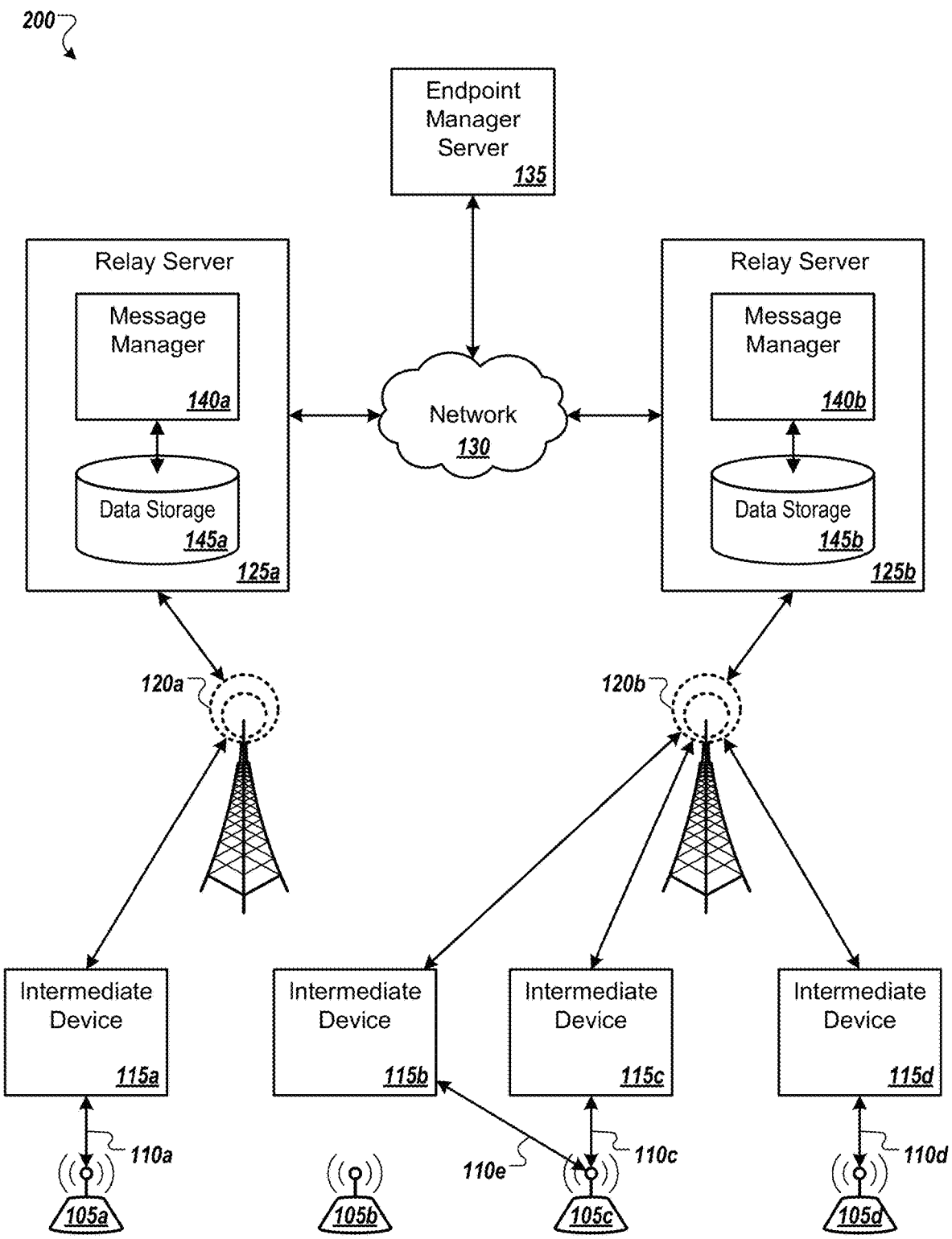
FIG. 2 illustrates an example network architecture.

FIG. 2 illustrates an example network architecture 200 in which embodiments of the present disclosure may be implemented. The network architecture 200 may include components illustrated and described in FIG. 1, such as one or more endpoint devices 105, one or more intermediate devices 115, one or more relay servers 125, and one or more endpoint manager servers 135. In particular, FIG. 2 illustrates how intermediate devices 115 may move within the network architecture 200 and how data is communicated within the network architecture 200 due to the movements.

As compared to FIG. 1, FIG. 2 illustrates that the intermediate device 115b has moved to a different geographical location. In response to this move, the intermediate device 115b is no longer in communication with the relay server 125a and instead, is in communication with the relay server 125b. The intermediate device 115b is also no longer close enough to the endpoint device 105b to be able to communicate with the endpoint device 105b. As illustrated, there is no intermediate device 115 that is within range of the endpoint device 105b. The endpoint device 105b, however, may continue to send beacons even though there is no device within range to receive the beacons.

Also illustrated, the intermediate device 115b is now within range of the endpoint device 105c. The intermediate device 115b is now able to communicate with the endpoint device 105c via the wireless network 110e, such as by receiving beacons from the endpoint device 105c and by sending response messages to the endpoint device 105c. In at least some embodiments, the intermediate device 115c may have previously received a beacon from the endpoint device 105c and may have forwarded the beacon to the relay server 125b. The relay server 125b may have sent a beacon message to the endpoint manager server 135 and may have received a response message from the endpoint manager server 135. Since the intermediate device 115b is now within range of the endpoint device 105c, as well as the intermediate device 115c, the relay server 125b may select one of the intermediate device 115b or the intermediate device 115c to handle sending the response message to the endpoint device 105c. The relay server 125b may use any selection criteria to select which intermediate device 115 to use to send the response message, such as a connection strength between the intermediate device 115 and the target endpoint device 105, a proximity of an endpoint device 105 to an intermediate device 115, a type of wireless network 110 that connects an intermediate device 115 and an endpoint device 105, a cost of a connection between an intermediate device 115 and an endpoint device 105, a current battery level of the intermediate device, a type of intermediate device, etc.

In at least some embodiments, both of the intermediate device 115b and the intermediate device 115c are within range of the endpoint device 105c and both receive the same beacon from the endpoint device 105c. Further, the intermediate device 115b and the intermediate device 115c both may forward the beacon of the endpoint device 105c to the relay server 125b. To reduce redundancy, network traffic, battery life, etc., the relay server 125b may select one of the intermediate device 115b and the intermediate device 115c to handle communication with the endpoint device 105c and instruct the non-selected intermediate device to ignore beacons from the endpoint device 105c, to discard beacons from the endpoint device 105c, to stop sending beacons from the endpoint device 105c, or any other operation that may reduce network congestion, free-up data storage space, free-up processor capabilities, etc. As more intermediate devices 115 become available for data transport, data transmission frequency for a particular intermediate device may decrease. In the long term, with enhanced density intermediate device and machine learning based protocols, the technology described here may significantly improve battery life for intermediate devices, reduce network congestion, improve global connectivity, etc. The relay server 125b may use any selection criteria to select which intermediate device 105 to use to communicate with the endpoint device 105 and which intermediate device to cease communications regarding the endpoint device 105, such as a connection strength between the intermediate device 115 and the target endpoint device 105, a proximity of an endpoint device 105 to an intermediate device 115, a type of wireless network 110 that connects an intermediate device 115 and an endpoint device 105, a cost of a connection between an intermediate device 115 and an endpoint device 105, a current battery level of the intermediate device, a type of intermediate device, etc.

Figure 3:
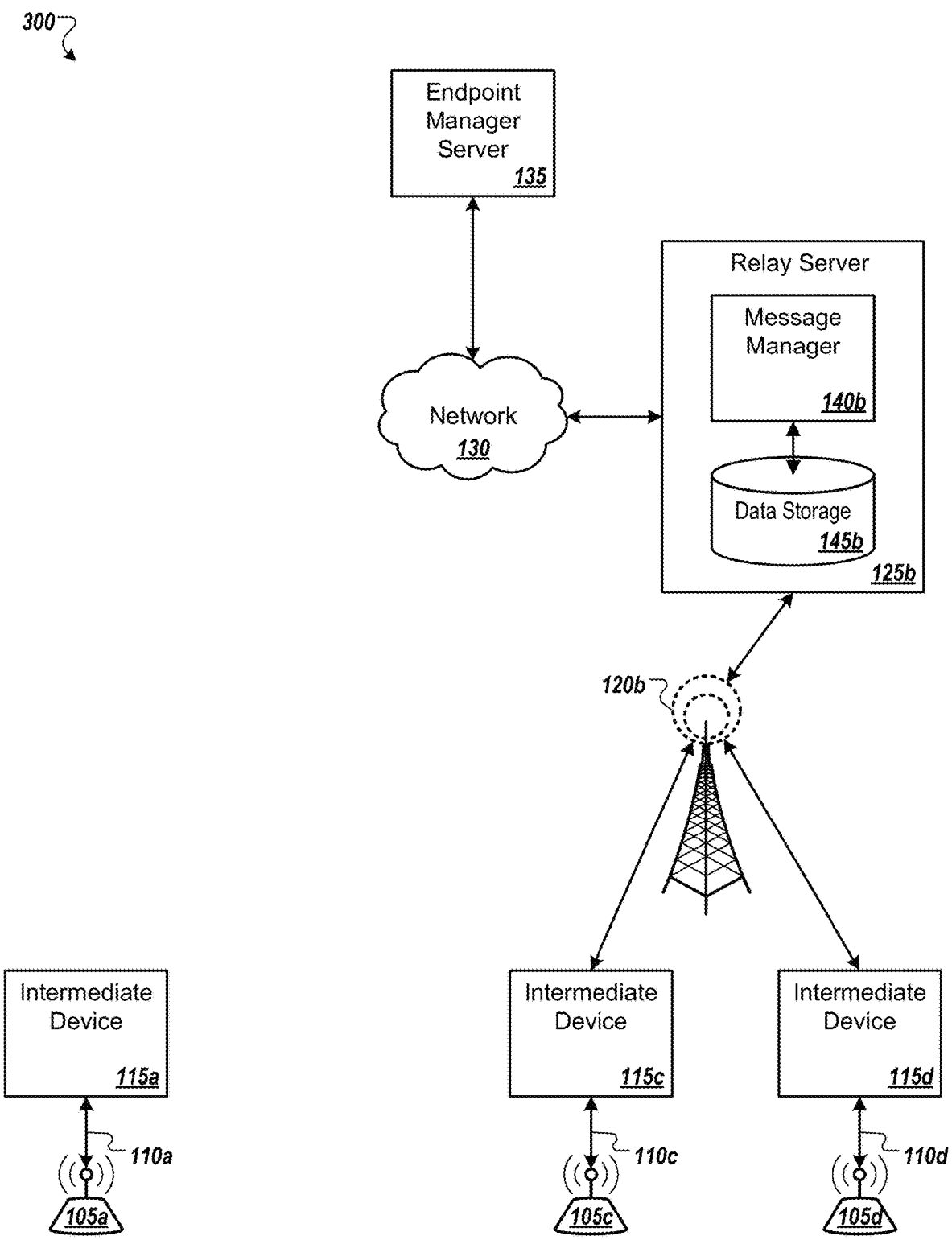
FIG. 3 illustrates an example network architecture.

FIG. 3 illustrates an example network architecture 300 in which embodiments of the present disclosure may be implemented. The network architecture 300 may include components illustrated and described in FIG. 1, such as one or more endpoint devices 105, one or more intermediate devices 115, one or more relay servers 125, and one or more endpoint manager servers 135. In particular, FIG. 3 illustrates how an intermediate device 115a may communicate with endpoint device 105a even without the intermediate device 115a being connected to the second network 102 (e.g., without having an active Internet connection). For example, the intermediate device 115a may move to an area with little or no cellular coverage and still be able to receive beacons from endpoint devices 105. Further, the intermediate device 115a may have previously received a message addressed to the endpoint device 105a. The intermediate device 115a may store this message until the intermediate device 115a is within range of the endpoint device 105a, upon which the intermediate device 115a may send the message to the endpoint device 105a. In at least some embodiments, the intermediate device 115a may have been selected by a relay server 125 to handle this particular message for endpoint device 105a based on prior activities of the intermediate device 115a. For example, the intermediate device 115a may have previously carried messages to the endpoint device 105a. Additionally or alternatively, the intermediate device 115a may be the only intermediate device that has communicated with the endpoint device 105a, or the intermediate device 115a may be the most recent intermediate device to have communicated with the endpoint device 105a.

Figure 4:
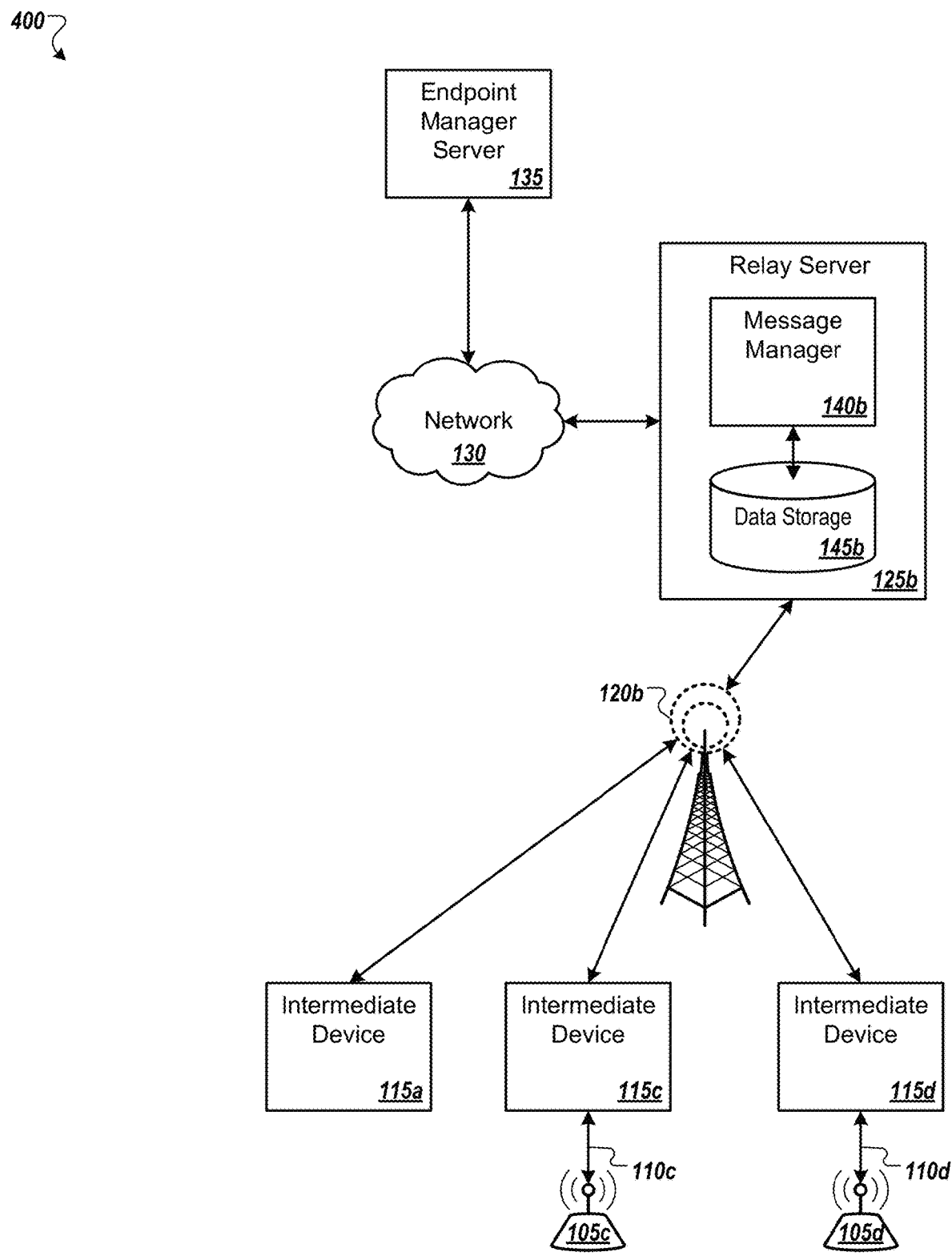
FIG. 4 illustrates an example network architecture.

FIG. 4 illustrates an example network architecture 400 in which embodiments of the present disclosure may be implemented. The network architecture 400 may include components illustrated and described in FIG. 1, such as one or more endpoint devices 105, one or more intermediate devices 115, one or more relay servers 125, and one or more endpoint manager servers 135. In particular, FIG. 4 illustrates how an intermediate device 115a that was previously not connected to the second network 120 (as illustrated in FIG. 3) can move within range of the second network 120 and communicated data received from the endpoint device 105a. As illustrated in FIG. 4, the intermediate device 115a has moved to a location that is within range of the second network 120b.

Once connected to the relay server 125b via the second network 120b, the intermediate device 115a may send a beacon received from the endpoint device 105a. The intermediate device 115a may also receive additional messages from the relay server 125b that that are addressed to the endpoint device 105a that the intermediate device 115a may send to the endpoint device 105a at a later time.

Figure 5:
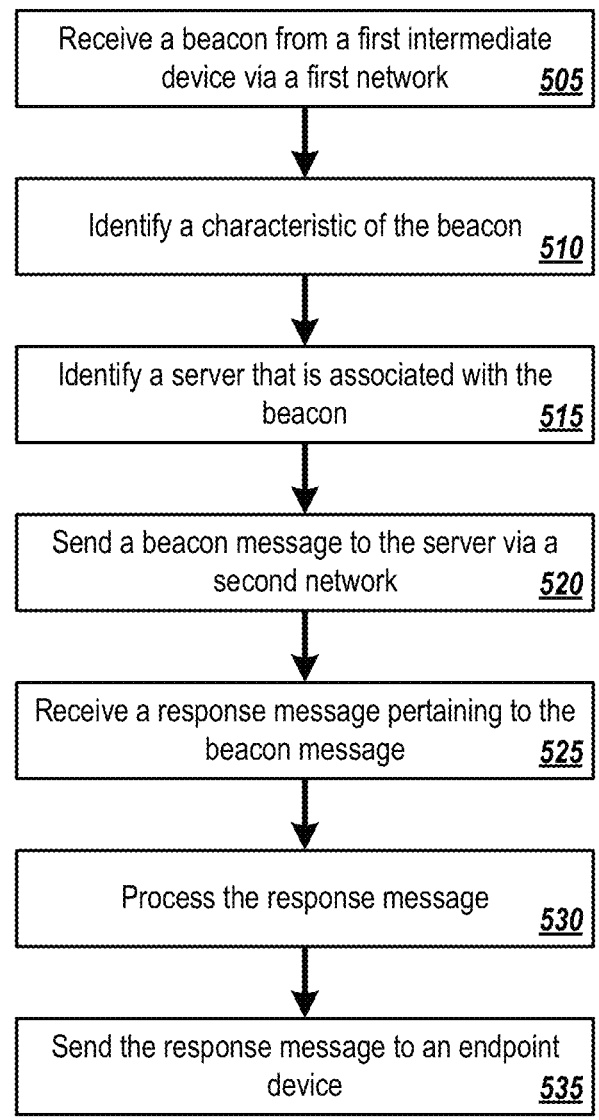
FIG. 5 illustrates a flow diagram of an example method to handle communications between devices.
Figure 6:
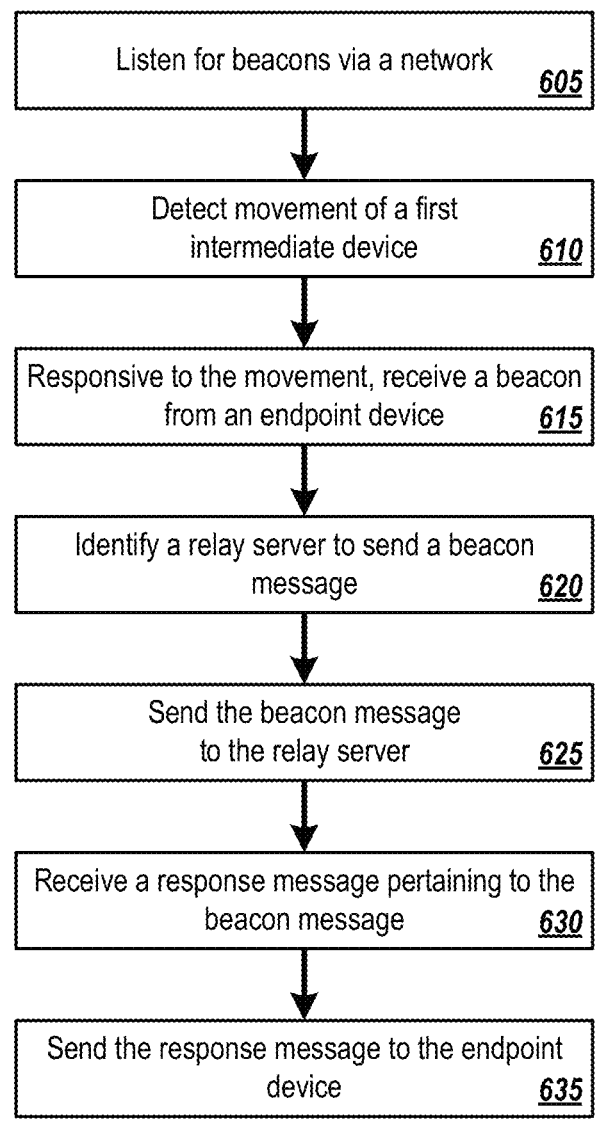
FIG. 6 illustrates a flow diagram of an example method to handle communications between an endpoint device and other device.
Figure 7:
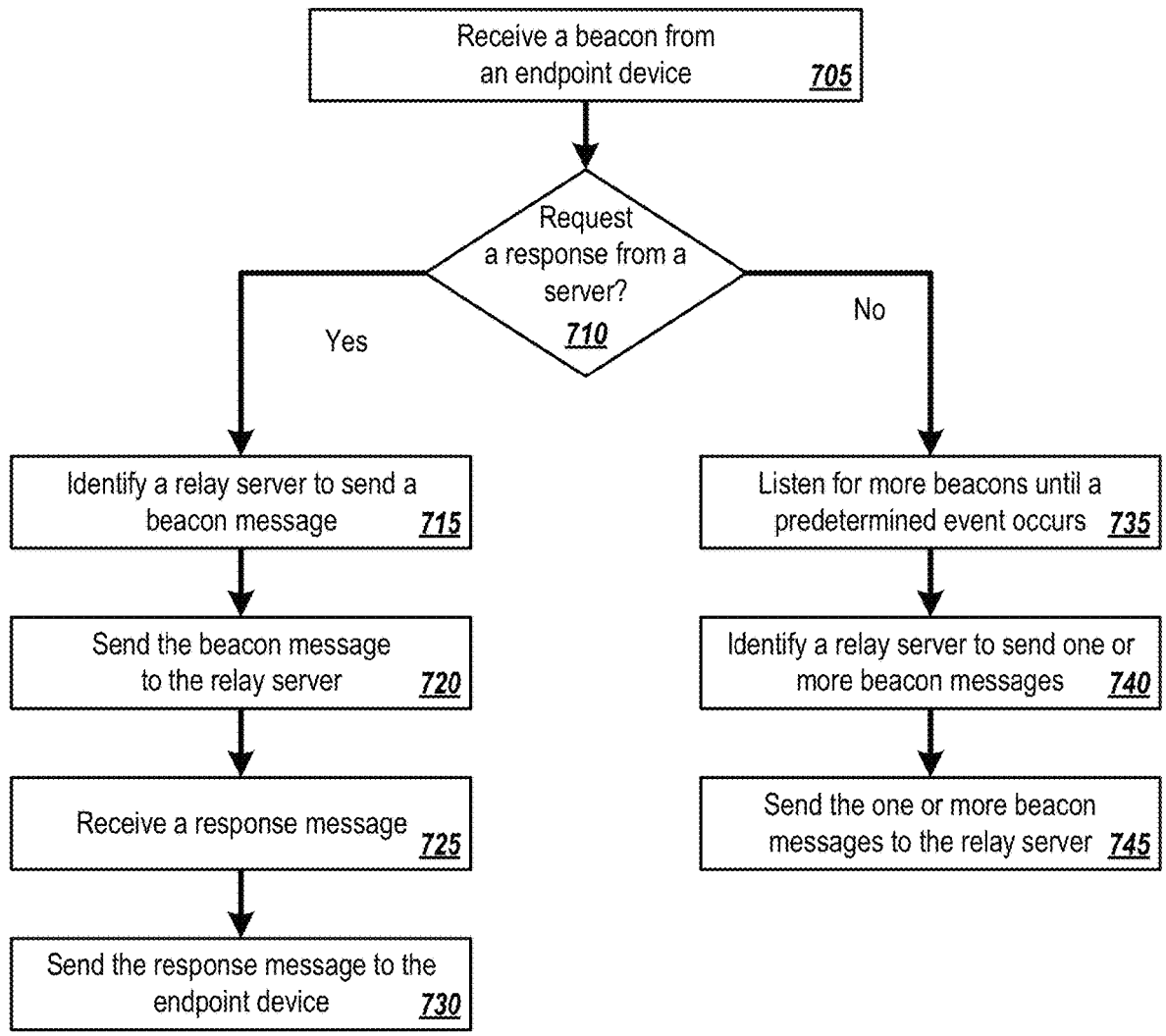
FIG. 7 illustrates a flow diagram of an example method to handle communications between an endpoint device and other devices.

FIGS. 5-7 illustrate flow diagrams of example methods related to decentralized networking. The methods may be performed by processing logic that may include hardware (circuitry, dedicated logic, etc.), software (such as is run on a general purpose computer system or a dedicated machine), or a combination of both, which processing logic may be included in the intermediate device 115 and/or the relay server 125 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 5 illustrates a flow diagram of an example method 500 to handle communications between devices. For example, the example method 500 may be performed by a relay server (e.g., the relay server 125 of FIGS. 1-4) to handle communications for and between an endpoint device (e.g., the endpoint device 105 of FIGS. 1-4) and an endpoint manager server 135 (e.g., the endpoint manager server 135 of FIGS. 1-4).

The method 500 may begin at block 505, where processing logic may receive a beacon from a first intermediate device via a first network. The first intermediate device may include the intermediate device 115a of FIG. 1, for example. The beacon may have been received by the first intermediate device from an endpoint device (e.g., the endpoint device 105a of FIG. 1) via a second network (e.g., the wireless network 110a of FIG. 1). In at least some embodiments, the first network is a longer-range network or a higher-power network as compared to the second network.

At block 510, the processing logic may identifying a characteristic of the beacon. For example, the beacon may include data indicative of a geographical location of the endpoint device and an identifier of the endpoint device. Identifying the characteristic of the beacon may include scanning the beacon to identify the data indicative of the geographical location of the endpoint device and the identifier of the endpoint device.

At block 515, the processing logic may identifying a server that is associated with the beacon. The server may include the endpoint manager server 135 of FIG. 1. In at least some embodiments, the processing logic may use the characteristic of the beacon to identify the server. For example, the identifier of the endpoint device may be associated with a particular server. The processing logic may use the identifier of the endpoint device as a key to lookup the server and/or an address of the server.

At block 520, the processing logic may send a beacon message to the server via a third network. The third network may include the network 130 of FIG. 1. In at least some embodiments, the beacon message may include at least one of: the beacon, or information pertaining to the beacon, such as data collected by the beacon. In at least some embodiments, sending the beacon message to the server via the third network may include sending the identifier of the endpoint device to the server. The processing logic may send the beacon message to the server as a push or pull message.

At block 525, the processing logic may receive, from the server, a response message pertaining to the beacon message. In at least some embodiments, the response message may be addressed to a second intermediate device (e.g., the intermediate device 115b of FIG. 1), or a user device. In at least some embodiments, the response message may include an indication that the endpoint device—a lost device—has been found. The response message may also include at least one instruction, executable by the second intermediate device or user device, to display a location of the endpoint device on an electronic map.

At block 530, the processing logic may process the response message. In at least some embodiments, processing the response message includes sending the response message to the second intermediate device. In at least some embodiments, the response message may include an instruction executable by the endpoint device and processing the response message may include sending the response message to the endpoint device. Processing the response message may also include storing the response message.

At block 535, the processing logic may send the response message to an endpoint device. In at least some embodiments, sending the response message to the endpoint device may include identifying an intermediate device that is currently communicatively coupled to the endpoint device, such as any of the intermediate devices 115 of FIG. 1. Sending the response message to the endpoint device may also include sending the response message to the identified intermediate device with an instruction to forward the response message to the endpoint device.

FIG. 6 illustrates a flow diagram of an example method 600 to handle communications between an endpoint device and other devices. For example, the example method 600 may be performed by an intermediate device (e.g., the intermediate device 115 of FIGS. 1-4) to handle communications for and between an endpoint device (e.g., the endpoint device 105 of FIGS. 1-4) and an endpoint manager server 135 (e.g., the endpoint manager server 135 of FIGS. 1-4). In at least some embodiments, the processing logic may include software that is installed on more than one device.

The method 600 may begin at block 605, where processing logic may listen for the beacon. In at least some embodiments, the processing logic may by periodically scan for beacons via a first network (e.g., the wireless network 110 of FIG. 1). The processing logic may also subscribe to beacons of one or more endpoint devices.

At block 610, the processing logic may detect movement of a first intermediate device from a first geographic location to a second geographic location. For example, the first intermediate device may include a motion sensor, such as a gyroscope, accelerometer, GPS, network triangulator, etc. to determine movement of the first intermediate device.

At block 615, the processing logic may, responsive to the first intermediate device moving to the second geographic location, receive a beacon from an endpoint device. For example, the first intermediate device may, upon entering a new geographic location, scan for any beacons from endpoint devices. For as long as the first intermediate device stays relatively still, the first intermediate device may not further scan for beacons. Once the first intermediate device moves, the first intermediate device may scan for beacons. In at least some embodiments, the first intermediate device is configured to receive the beacon from the endpoint device via the first network.

At block 620, the processing logic may identify a relay server (e.g., the relay server 125 of FIG. 1) to send a beacon message. The beacon message may include at least one of: the beacon, or information pertaining to the beacon, as described herein. In at least some embodiments, identifying the relay server to send the beacon message may include determining a geographic location of the first intermediate device and identifying the relay server from a set of relay servers. For example, the processing logic may select the relay server that is the closest relay server to the geographic location of the first intermediate device.

At block 625, the processing logic may send the beacon message from the endpoint device to the relay server. In at least some embodiments, the beacon message may be sent from the endpoint device to the relay server in response to a determination that the first intermediate device is connected to a second network (e.g., the second network 120 of FIG. 1). In at least some embodiments, sending the beacon message from the endpoint device to the relay server may include sending the beacon message from the endpoint device to the relay server via the second network.

At block 630, the processing logic may receive, from the relay server, a response message pertaining to the beacon message. The response message may include an identification of the endpoint device to which to send the response message. In at least one embodiment, receiving the response message pertaining to the beacon message may include receiving the response message at a second intermediate device, such as the intermediate device 115b of FIG. 1. The first intermediate device and the second intermediate device may both have instances of a executable software application that form a virtual network of interconnected devices that may be used to transmit, carry, and receive data.

At block 635, the processing logic may send the response message to the endpoint device, such as via the wireless network 110 of FIG. 1. In at least one embodiment, sending the response message to the endpoint device may include determining that the response message includes an instruction to send the response message to the endpoint device. To determine whether the response message includes such an instruction, the processing logic may inspect the response message, or metadata associated with the response message, to determine that the response message is to be sent to the endpoint device. In at least one embodiment, the response message may be sent to the endpoint device may via the first intermediate device or the second intermediate device.

FIG. 7 illustrates a flow diagram of another example method 700 to handle communications between an endpoint device and other devices. For example, the example method 700 may be performed by an intermediate device (e.g., the intermediate device 115 of FIGS. 1-4) to handle communications for and between an endpoint device (e.g., the endpoint device 105 of FIGS. 1-4) and an endpoint manager server 135 (e.g., the endpoint manager server 135 of FIGS.

1-4). In at least some embodiments, the processing logic may include software that is installed on more than one device.

The method 700 may begin at block 705, where processing logic may receive a beacon from an endpoint device, such as via a wireless network (e.g., the wireless network 110 of FIG. 1). At block 710, the processing logic may determine whether to request a response message from a server (e.g., the endpoint manager server 135 of FIG. 1).

In response to a determination to request a response message from a server ("YES" at block 710), the processing logic may identify a relay server to send a beacon message at block 715. At block 720, the processing logic may send the beacon message to the server identified at block 715. At block 725, the processing logic may receive a response message from the server. At block 730, the processing logic may send the response message to the endpoint device.

In response to a determination to request a response message from a server ("NO" at block 710), the processing logic at block 735 may listen for more beacon until a predetermined event occurs. The predetermined event may include a lapse of a predetermined period of time, reaching a time threshold, reaching a storage capacity, reaching a buffer limit, etc. At block 740, the processing logic may identify a relay server to send one or more beacon messages associated with one or more beacons identified at block 735. At block 745, the processing logic may send the one or more beacon messages to one or more relay servers.

Figure 8:
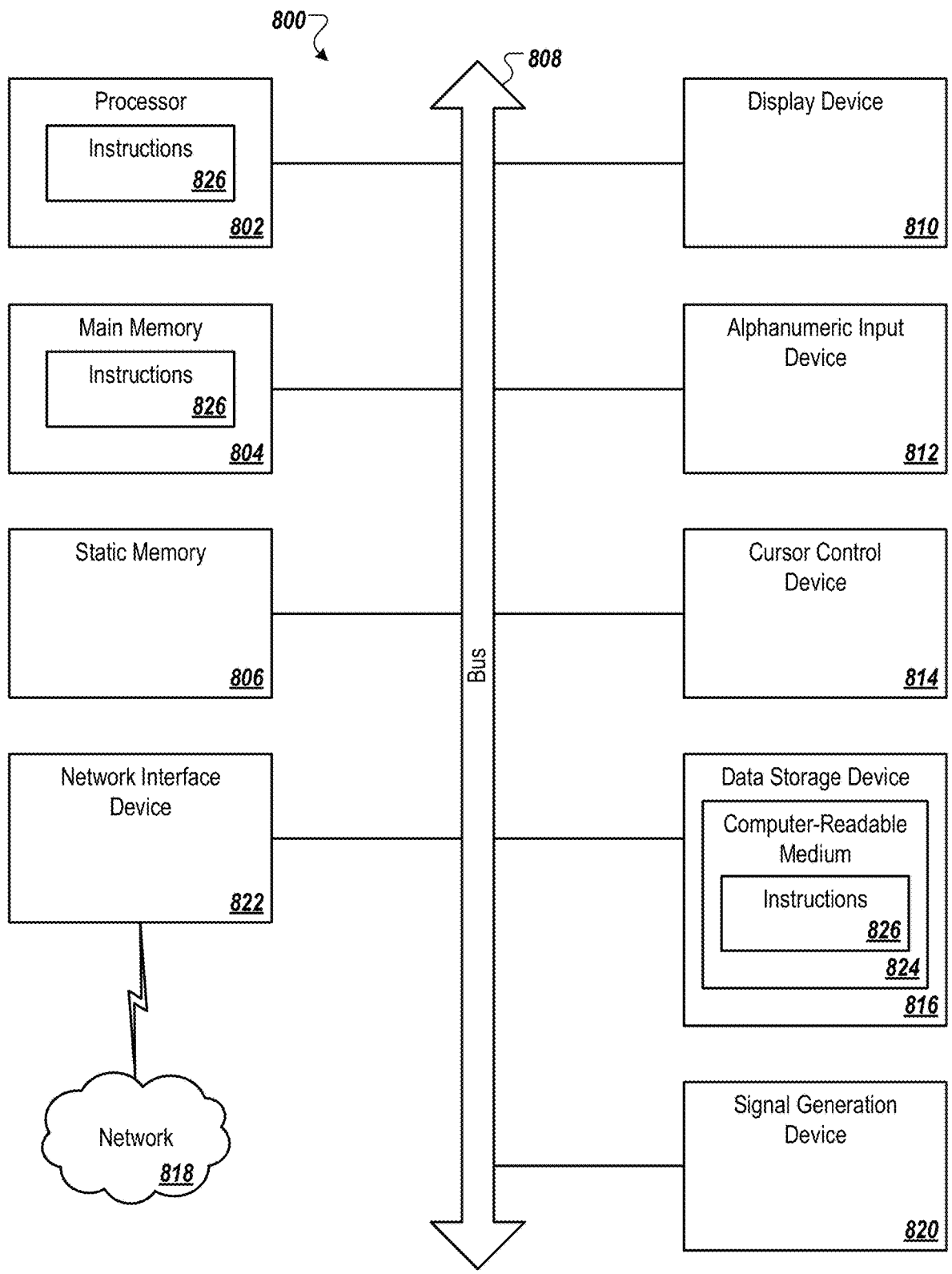
FIG. 8 illustrates a diagrammatic representation of a machine in the example form of a computing device within which a set of instructions, for causing the machine to perform any one or more of the methods discussed herein, may be executed, and all arranged in accordance with at least one embodiment described herein.

FIG. 8 illustrates a diagrammatic representation of a machine in the example form of a computing device 800 within which a set of instructions, for causing the machine to perform any one or more of the methods discussed herein, may be executed. The computing device 800 may include a mobile phone, a smart phone, a netbook computer, a rack-mount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one embodiment, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A system, comprising:
a memory; and
one or more processors operatively coupled to the memory, the one or more processors being configured to execute operations to cause the system to perform operations comprising:
receive a beacon from a first intermediate device via a first network, wherein the beacon was received by the first intermediate device from an endpoint device via a second network;
identify a characteristic of the beacon, the characteristic of the beacon including an identifier of the endpoint device;
use the identifier of the endpoint device to perform a lookup in a data record to identify a particular server that is associated with the beacon;
select the particular server based on a result of the lookup in the data record;
send a beacon message to the server via a third network, the beacon message including at least one of the beacon, or information pertaining to the beacon;
receive, from the server, a response message pertaining to the beacon message; and
process the response message.

2. The system of claim 1, wherein
the beacon includes data indicative of a geographical location of the endpoint device.

3. The system of claim 2, wherein when identifying the characteristic of the beacon, the system is to scan the beacon to identify the data indicative of the geographical location of the endpoint device and the identifier of the endpoint device.

4. The system of claim 3, wherein when sending the beacon message to the server via the third network, the system is to send the identifier of the endpoint device to the server.

5. The system of claim 1, wherein the first network is a longer-range network as compared to the second network.

6. The system of claim 1, wherein the response message is addressed to a second intermediate device, wherein the response message includes an indication that the endpoint device has been found, wherein the response message includes at least one instruction, executable by the second intermediate device, to display a location of the endpoint device on an electronic map, wherein when processing the response message, the system is to send the response message to the second intermediate device.

7. The system of claim 1, wherein the response message includes an instruction executable by the endpoint device, wherein when processing the response message, the system is to send the response message to the endpoint device.

8. The system of claim 1, wherein when sending the response message to the endpoint device, the system is to:

identify an intermediate device that is currently communicatively coupled to the endpoint device, wherein the intermediate device includes the first intermediate device or a second intermediate device; and send the response message to the identified intermediate device with an instruction to forward the response message to the endpoint device.

9. A system, comprising:

a memory; and one or more processors operatively coupled to the memory, the one or more processors being configured to execute operations to cause the system to perform operations comprising:

detect movement of a first intermediate device from a first geographic location to a second geographic location;

responsive to the first intermediate device moving to the second geographic location, receive a beacon from an endpoint device, the beacon including an identifier of the endpoint device;

identify a relay server to send a beacon message, the beacon message including the identifier of the endpoint device and at least one of the beacon, or information pertaining to the beacon;

select the relay server using the beacon message; and send the beacon message with the identifier of the endpoint device to the relay server.

10. The system of claim 9, the operations further comprising to listen for the beacon by periodically scanning for beacons via a first network.

11. The system of claim 10, wherein the first intermediate device is configured to receive the beacon from the endpoint device via the first network.

12. The system of claim 11, wherein the beacon message is sent from the endpoint device to the relay server in response to a determination that the first intermediate device is connected to a second network, wherein when sending the beacon message from the endpoint device to the relay server, the system is to send the beacon message from the endpoint device to the relay server via the second network.

13. The system of claim 9, wherein when identifying the relay server to send the beacon message, the system is to:

determine a geographic location of the first intermediate device; and identify the relay server from a set of relay servers, wherein the relay server is the closest relay server to the geographic location of the first intermediate device from the set of relay servers.

14. The system of claim 9, the operations further comprising to receive, from the relay server, a response message pertaining to the beacon message.

15. The system of claim 14, the operations further comprising to send the response message to the endpoint device.

16. The system of claim 15, wherein when receiving the response message pertaining to the beacon message, the system is to receive the response message at a second intermediate device.

17. The system of claim 16, wherein when sending the response message to the endpoint device, the system is to send the response message to the endpoint device via the second intermediate device.

18. The system of claim 15, wherein when sending the response message to the endpoint device, the system is to determine that the response message includes an instruction to send the response message to the endpoint device.

* * * * *